United States Patent [19]

Hopkins et al.

[11] Patent Number: 5,749,589
[45] Date of Patent: May 12, 1998

[54] AIRLINE BAGGAGE CART

[75] Inventors: Anthony Hopkins, Bartlett, Ill.; Dale Matlock, Twins Lakes, Wis.; John Senter, Gurnee, Ill.; Fred Shield, Hanover Park, Ill.; Chet Malanowski, Barrington, Ill.; James Ortery, Aurora, Ill.; Frank Wilson, Woodridge, Ill.; Leonard Timpone, LaGrange, Ill.; Richard Pugh, Glendale, Ill.; Joel Heyndricks, Woodstock, Ill.; Ronald Kotlarz, Elk Grove, Ill.; Stanley Lorenz, McHenry, Ill.; Ralph Unrath, Round Lake Beach, Ill.

[73] Assignee: United Air Llines, Chicago, Ill.

[21] Appl. No.: 549,342

[22] Filed: Oct. 27, 1995

[51] Int. Cl.$^6$ ............................................. B62D 21/00
[52] U.S. Cl. ................................. 280/47.34; 230/79.11
[58] Field of Search ......................... 280/47.34, 47.35, 280/79.11, 79.2, 79.3, 408, 411.1, 410, 785; 296/188, 203, 205; 29/897.2; 267/292

[56] References Cited

U.S. PATENT DOCUMENTS

| 993,491 | 5/1911 | Wiselogel | 280/79.3 |
|---|---|---|---|
| 2,756,894 | 7/1956 | Phillips | 280/79.2 |
| 3,073,620 | 1/1963 | Beck | 267/292 |
| 3,372,829 | 3/1968 | Averill | 280/79.3 |
| 4,806,437 | 2/1989 | Yokoi et al. | 267/292 |
| 4,863,179 | 9/1989 | Isaacs | 280/79.11 |
| 4,949,986 | 8/1990 | Gohier | 280/410 |
| 4,986,596 | 1/1991 | Gohier | 396/203 |
| 5,199,729 | 4/1993 | Sievert et al. | 280/79.2 |
| 5,257,794 | 11/1993 | Nakamura | 280/79.3 |

OTHER PUBLICATIONS

FMC Airline Equipment Division, Nonmetallic Baggage/Cargo Cart Assembly Instructions; May 1987.

FMC Airline Equipment Division; Side End Transfer Trailer Operation And Maintenance Manual With Illustrated Parts List; May 1984.

WASP, Inc.; Operation And Maintenance Manual For LD 3 Container Trailer; May 15, 1989; May 15, 1990.

WASP, Inc.; Operation And Maintenance Manual For LD 11 Side/End Load Container Trailer; Mar. 27, 1992.

WASP, Inc.; Operation And Maintenance Manual For Caster Bed Cargo Dolly With Deck; Jan. 30, 1995; May 26, 1995; May 11, 1995; Nov. 10, 1992; Feb. 14, 1983; Jul 5, 1995.

WASP, Inc.; Operation And Maintenance Manual For United Cargo Cart; Aug. 1, 1990; Nov. 25, 1991; Aug. 1, 1989; Nov. 25, 1991.

WASP, Inc.; Operation And Maintenance Manual For United Bag Cart; Aug. 1, 1989.

*Primary Examiner*—Brian L. Johnson
*Assistant Examiner*—Frank Vanaman
*Attorney, Agent, or Firm*—Brinks Hofer Gilson & Lione

[57] ABSTRACT

An airline baggage cart includes a wheeled chassis, a mounting assembly, and a cart body. The mounting assembly includes angle brackets for attachment to the chassis and to dampened runner members. The cart body includes a base frame and four corner posts secured to the base frame, roof supports secured to the corner posts, and corrugated metal wall panels secured to the posts. A roof panel formed from a single sheet of metal is secured to the roof supports, and a floor panel formed from a single sheet of metal is secured to the base frame. The runners may be raised by the angle brackets above the chassis frame by a sufficient distance to allow a forklift fork to enter between the chassis frame and the runners for lifting the baggage cart with improved stability and decreased likelihood of damage to the cart.

10 Claims, 4 Drawing Sheets

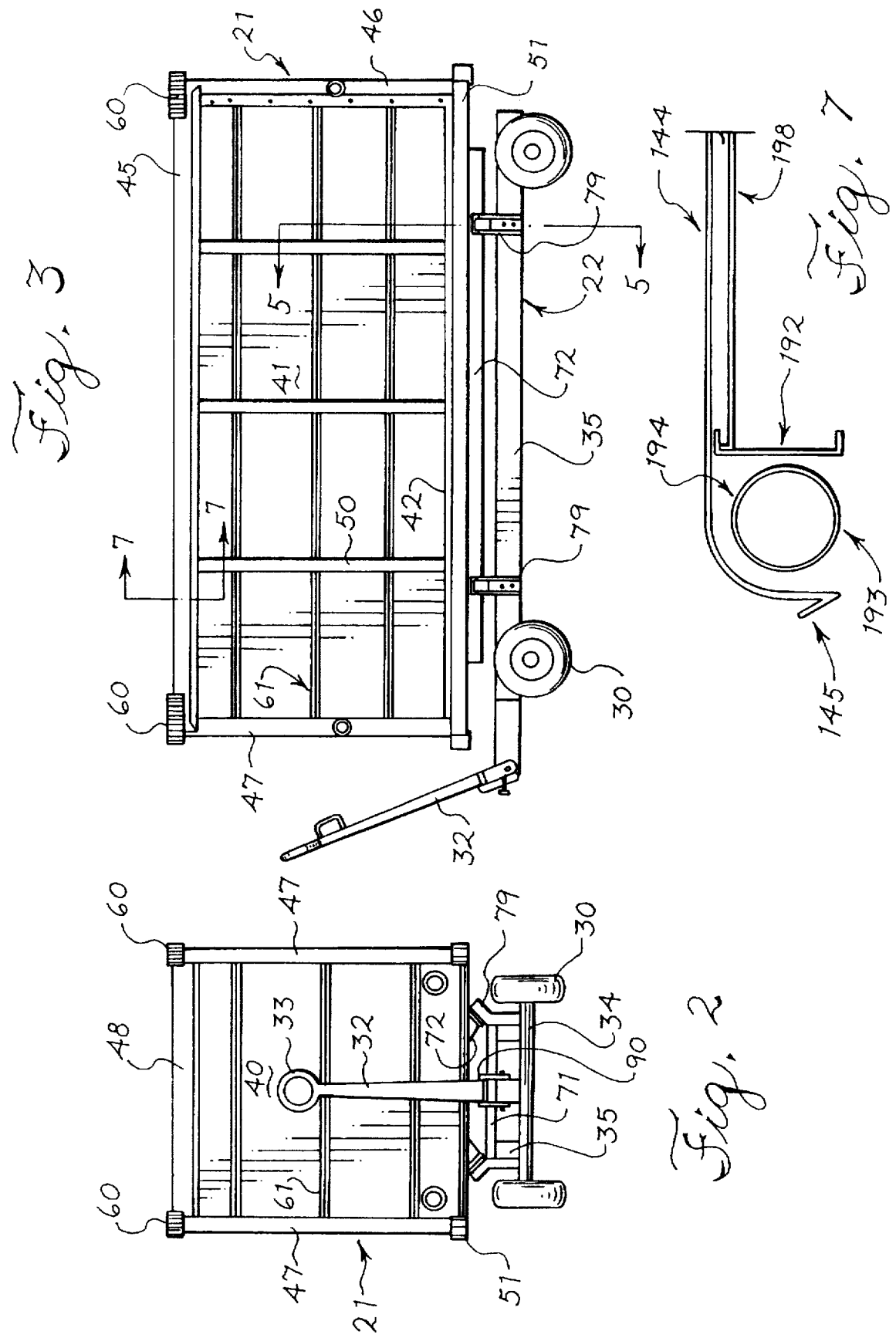

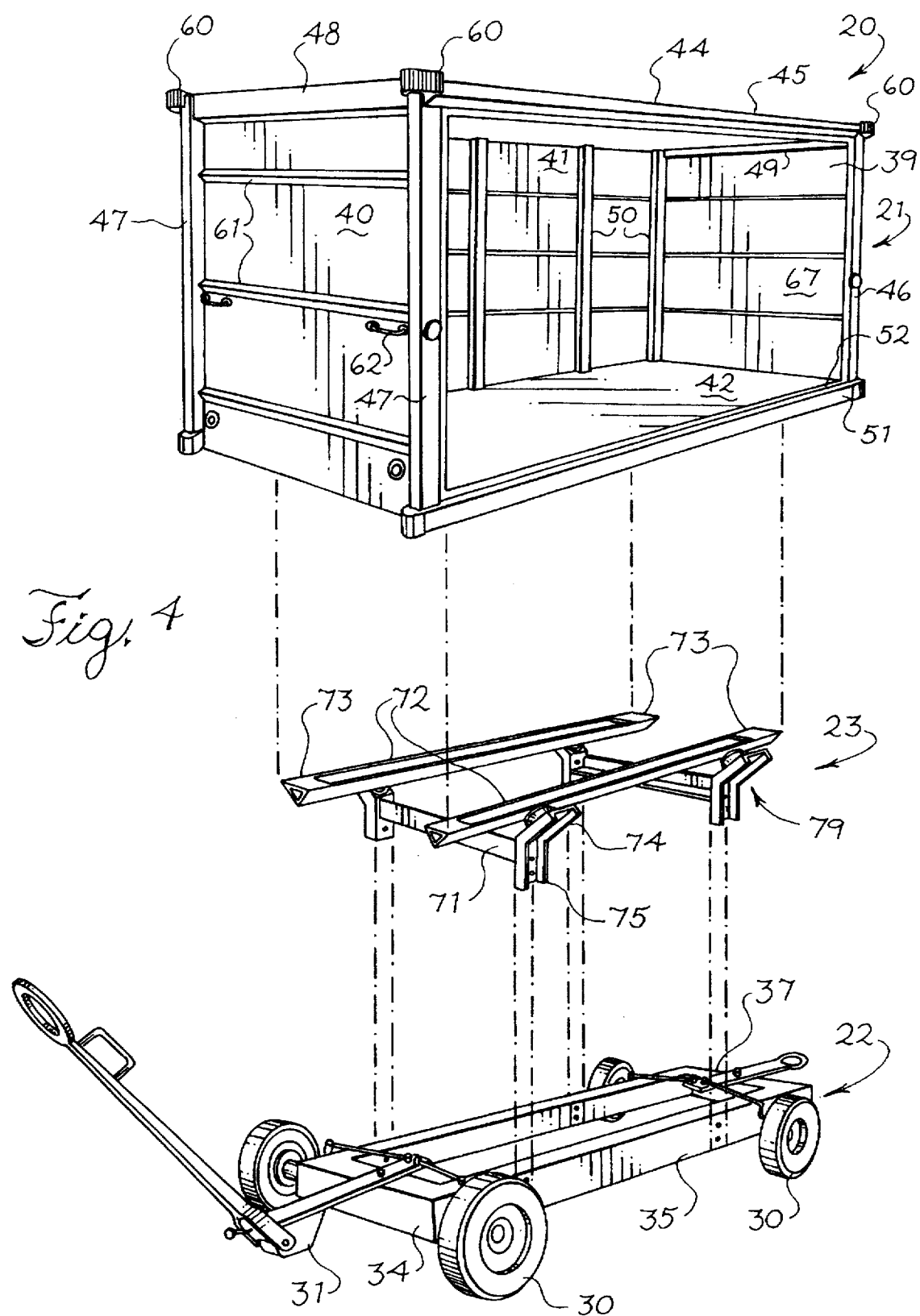

AIRLINE BAGGAGE CART

BACKGROUND OF THE INVENTION

This invention relates to wheeled carts, and more particularly to airline baggage carts used for transporting luggage, packages and the like between aircraft and airport ground facilities.

Airline baggage carts and similar wheeled vehicles are utilized in airports to transport luggage throughout airport ground facilities. Carts of this type are typically connected in tandem or in trains for towing by motorized tractors. The carts are available in several configurations to accommodate passenger baggage, mail cargo, or oversized cargo containers. For these applications, both single-sided and double-sided access carts are available.

In general, conventional baggage carts are made from all-metal bodies and are subject to severe weather conditions and rigorous use. Such use often results in damage to the carts, including dents, scratches, rust, and wear of the carts' moving parts. Such damage also results from the strains associated with towing multiple carts behind a tractor, being unloaded and loaded with heavy amounts of cargo, and minor collisions with other carts or ground vehicles. Furthermore, in metal cart designs, the roof, shelves, and floors are often made of multiple sheets of metal which are subject to rusting and corrosion at the welded seams. The corrosion is caused by water collecting in these unlevel areas. As a result of the damage and corrosion, the carts must be repaired and serviced more frequently than desirable. Furthermore, after an extended period of such use, the carts may suffer damage severe enough to remove some carts from service.

In an attempt to reduce the denting and rust damage, some cart manufacturers have designed and produced a baggage cart body formed from hollow resilient plastic to be durable and resistant to the denting and corrosion problems inherent in metal carts. Such a cart design is shown, for example, in U.S. Pat. No. 4,986,596 to Gohier. This disclosure shows a plastic baggage cart body and a wheeled undercarriage which permits unrestricted steering and withstands forces imposed by trailing carts without transfer of such forces to the body.

Plastic cart designs have several shortcomings, however. For example, the plastic design decreases the amount of storage space available inside the cart. In addition, when the plastic cart is used in extreme variations in temperature and weather conditions, the plastic cart body is weakened. The weakened bodies are prone to fractures which may render the entire cart unusable. Moreover, replacement parts for the cracked plastic cart bodies can be expensive.

Baggage carts often need to be raised with a forklift truck in order to load heavy items onto airplane cargo holds or freight trucks. Certain previous designs, including the plastic carts described above, are not well suited for forklift manipulation because the floor of the cart body can bend when the cart is lifted. Also, such carts are susceptible to tipping over if they are lifted from the underside of the wheeled chassis.

In airports where the weather and use conditions are the most severe, previous cart designs typically have a useful life of as little as 10 years, after which the carts often need to be retired. However, the wheeled chassis of the carts, which are typically built of more durable materials and subject to less wear and damage than the cart bodies, are often in working condition or more easily repairable when their associated cart bodies must be discarded.

Therefore, there is a need for a baggage cart body which can be retrofitted onto a pre-manufactured wheeled chassis. There is also a need for an improved baggage cart body which can better withstand the rigors of various everyday uses throughout the most extreme weather conditions.

SUMMARY OF THE INVENTION

Accordingly, the present invention is directed to an airline baggage cart that substantially obviates one or more of the problems due to limitations and disadvantages of the related art.

To achieve this and other advantages, and in accordance with the purposes of the present invention, as embodied and broadly described, an airline baggage cart is provided which includes a wheeled chassis, a mounting assembly, and a cart body. The mounting assembly includes angle brackets for attachment to the chassis and to dampened runner members. The cart body includes a base frame and four corner posts secured to the base frame, roof supports secured to the corner posts, and metal wall panels secured to the posts. A roof panel formed from a single sheet of metal is secured to the roof supports, and a floor panel formed from a single sheet of metal is secured to the base frame.

In another aspect of the invention, a mounting assembly provides an interface between the cart body and wheeled chassis from carts of other designs. Thus, the mounting assembly may be adapted for use with wheeled chassis salvaged from discarded carts made by various manufacturers.

In yet another aspect of the invention, the runner members on the mounting assembly are raised by the angle brackets above the frame of the wheeled chassis. This creates an opening sufficiently wide to allow a forklift fork to enter under the runners, thereby allowing a forklift to lift the runners and the attached cart body with more stability.

In yet another aspect of the invention, a method of assembling an airline baggage cart is provided including the steps of removing a wheeled chassis from a used baggage cart, securing a mounting assembly including angle brackets to the chassis by fastening the angle brackets to the chassis, securing a base frame over the runner members, welding at least four upstanding corner posts to the base frame, welding corrugated metal wall panels to the corner posts, securing a one-piece roof panel over the corner posts, and securing a one-piece floor panel to the base frame.

The heavy-gauge corrugated construction of the metal walls adds significantly to the overall strength of the cart body, while the one-piece panel construction of the horizontal panels provides added resistance to accumulated moisture and associated corrosion.

It is to be understood that both the foregoing general description and the following detailed description are exemplary and explanatory and are intended to provide further explanation of the invention as claimed. Thus, the invention, together with further objects and attendant advantages, will best be understood by reference to the following detailed description of the preferred embodiments, taken in conjunction with the accompanying drawings.

BRIEF DESCRIPTION OF THE DRAWINGS

FIG. 2 is a front view of the baggage cart of FIG. 1.

FIG. 3 is a side view of the baggage cart of FIGS. 1 and 2.

FIG. 4 is an exploded perspective view of the baggage cart body, mounting assembly, and wheeled chassis of FIGS. 1-3.

FIG. 7 is a cut-away view taken along line 7—7 of FIG. 6.

DETAILED DESCRIPTION OF THE PRESENTLY PREFERRED EMBODIMENTS

Figure 1:
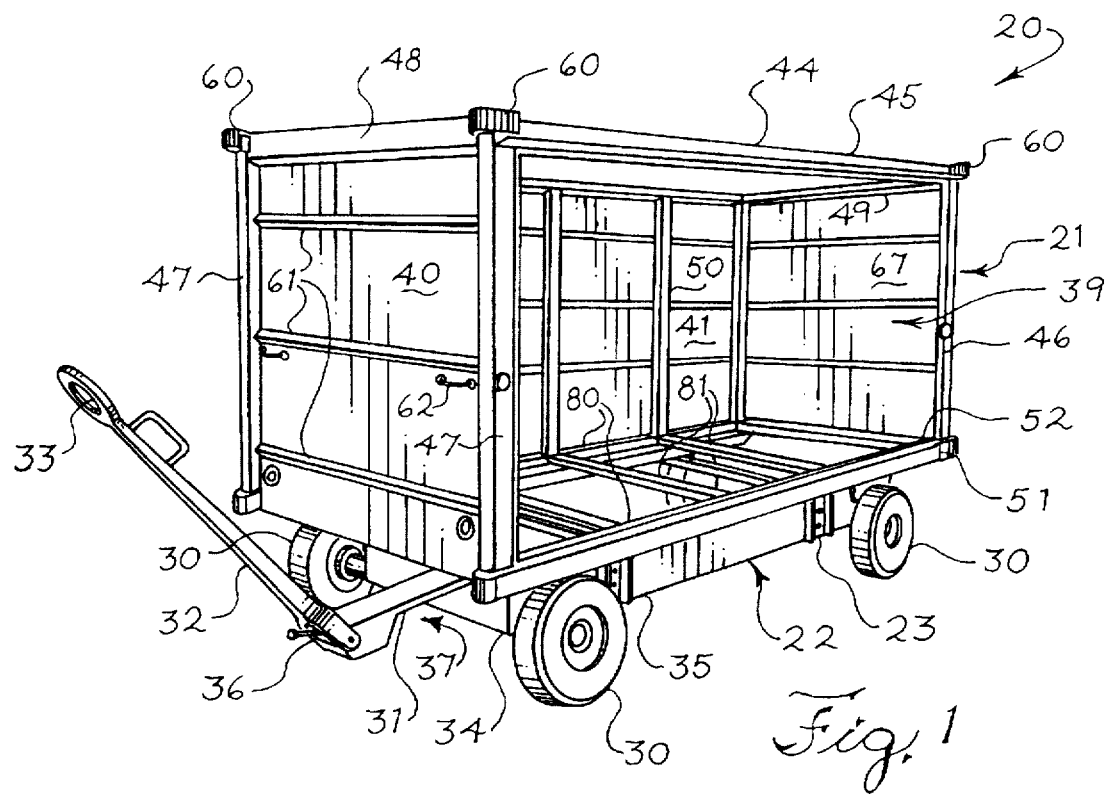
FIG. 1 is a perspective view of a preferred embodiment of a baggage cart of the present invention mounted to a wheeled chassis.

Referring now to the drawings at FIGS. 1-4, a baggage cart, indicated generally at 20, is shown which includes a body 21 and a chassis 22. The body 21 is supported over the chassis 22 by a mounting assembly indicated generally at 23. The chassis 22 may be of any conventional configuration having chassis main frame side bars 35, or any similarly framed chassis structure, for example the chassis manufactured by FMC Corporation. Attached directly to the main frame side bars 35 are axles 34 and four wheels 30 fastened by bearings (not shown) to the ends of the axles 34. A conventional steering assembly 90 is attached to the chassis 22 to allow front axle 34 to turn relative to the chassis 22. The cart body 21 is assembled from a base frame 52, four corner posts 47, a pair of roof side bars 45, and a pair of roof end supports 48. The cart embodiment as illustrated is in the configuration known in the art as a metal cargo cart, in that the cart body 21 defines an open side 39 into the hollow interior of the body 21. The remainder of body 21 is enclosed by a pair of end panels 40 and 67 supported between the upright corner posts 47 on each end of the body 21. The longer side of body 21 opposite open side 39 is covered by side panel 41 mounted across three upright supports 50 upstanding from base frame 52 and connected to one of the roof side bars 45. All of the upright supports and bars are fastened by conventional welds.

The base frame 52 includes a pair of long side bars 80 and three parallel stringers 81 welded across bars 80. The bars 80 and stringers 81 are constructed from 14-gauge rectangular-tube steel. The corner posts 47, upright supports 50, roof end supports 48, and the roof side bars 45 are constructed from 14-gauge square-tube steel. The roof end supports 48 roof side bar 45, and curtain rail brace 92 are welded to the corner posts 47, and the upright supports 50 are welded to the base frame 52 at the base frame side bars 80. The end panels 40 and 67 are welded to the corner posts 47 and the roof end supports 48 at the edges of the respective panels 40 and 67, and the side panel 41 is welded to the upright supports, roof side bar 45, and the base frame side bar 80. Each panel is formed from 14-gauge hot-rolled, oil-treated steel, and each is corrugated by forming outwardly extending folded grooves approximately ⅞ inch deep at three horizontal lines 61. These corrugations along the end panels 40 and 67 and the side panel 41 add significantly to the strength of the panels.

The side bars 80 of base frame 52 are each protected by a side bumper 51 formed from 12-gauge steel and welded to the side bar 80 of the base frame to protect the cart body 21 from damage from collisions or other abuse. The corners of the cart body 21, in particular where the corner posts 47, roof end supports 48, and roof side bars 45 converge, are protected by rubber bumpers 60.

Figure 5:
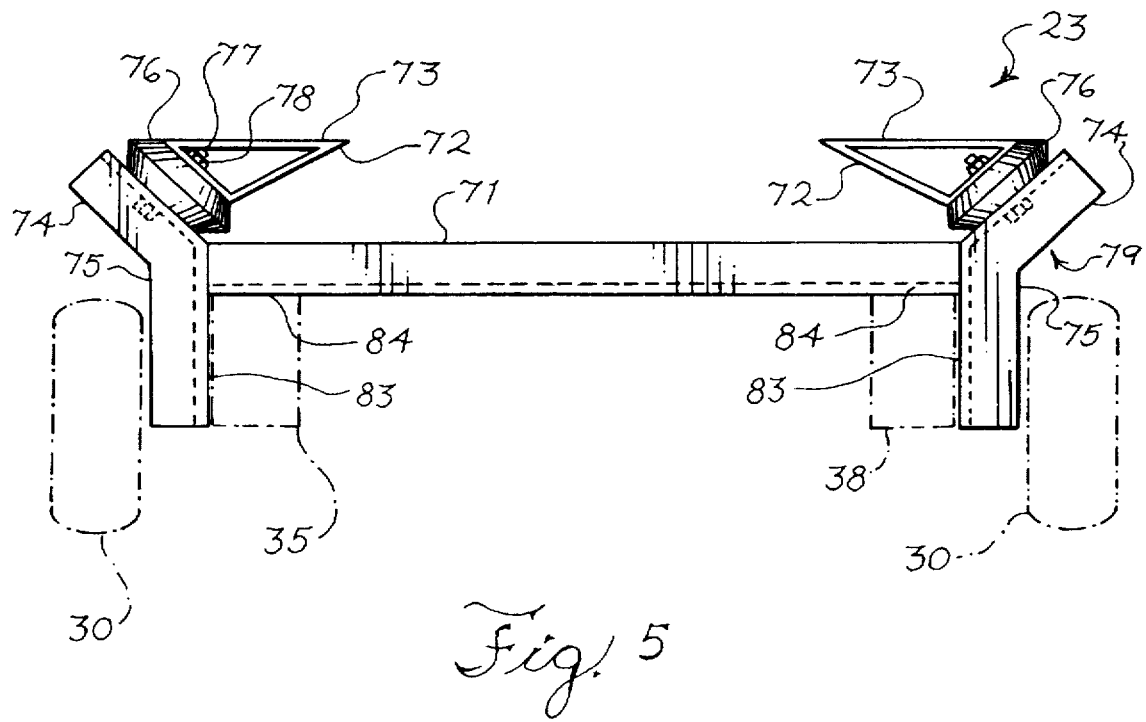
FIG. 5 is a cut-away view taken along line 5—5 of FIG. 3.

Referring now to FIGS. 4 and 5 in combination with the previous figures, the mounting of the chassis mounting assembly 23 in relation to the chassis main frame 35 and the cart body 21 is shown. Chassis mounting assembly 23 includes a pair of runners 72 formed from 10-gauge steel that are pre-formed into bars having a 900 angled cross section. In order to prevent the unbending of the runners 72, the ends of the runners 72 are protected by welding steel reinforcements 73 to the runners 72. The runners 72 are supported above the chassis main frame 35 by four angle brackets 79, the upper portion 74 of each bracket being bent to 45° from the substantially vertical lower portion 75. The upper portions 74 of two of brackets 79 are fastened to each runner 72 via a conventional bolt 77 and nut 78. Interposed between each runner 72 and each angle bracket 79 is a dampening pad 76 formed from a disk of flexible rubber, preferably of having a diameter of 4 inches. The dampening pad 76 absorbs vibration between the chassis main frame 35 and the cart body 21. A pair of cross bars 71 formed from 10-gauge 900 angled steel link the opposed pairs of angle brackets to form the chassis mounting assembly 23 as shown in FIGS. 4 and 5. The runners 72 are oriented toward the interior of the mounting assembly 23, and the upper portions 74 of the angle brackets 79 project outwardly from the cross bars 71. The cross bars 71 are welded at their end points to the angle brackets 79. Furthermore, the bent angle brackets 79 are welded at their bent points to strengthen the angled joint.

The chassis mounting assembly 23 fits over the pre-manufactured chassis 22 and its main frame side bars 35 and is held laterally in place by the lower portions 75 of the angle brackets 79 of the frame 23. Preferably, the lengths of runners 72, the separation between angle brackets 79 along these runners, and the lengths of the cross bars 71 dictate the overall width and length of the chassis mounting assembly 23 to conform to the size of the chassis 22.

As shown in FIG. 5, the mounting assembly 23 is preferably welded to the pre-manufactured chassis main frame side bars 35 at points 83 of the angle brackets 79, and at point 84 of the cross bars 71. In the alternative, the chassis mounting assembly 23 may be fixed to the chassis main frame side bars 35 via mounting bolts through either the angle brackets 79 or the cross bars 71.

Preferably, the runners 72 are raised by the angle brackets 79 above the chassis mainframe sidebars 35 a sufficient distance to allow the lifting fork of a forklift to enter between the runners 72 and the sidebars 35. This facilitates lifting the cart body 21 when it is carrying extremely heavy items.

To completely assemble the cart 20, the base frame 52 of cart body 21 is placed on runners 72 and welded in place. In particular, the stringers 81 of the baseframe 52 are welded to the tops of runners 72 on the chassis mounting assembly 23. This provides a strong and multiple-pointed connection between the chassis mounting assembly 23 and the body 21.

The forward end of the chassis main frame 35 is attached via steering assembly 90 to a towing assembly 31, which includes a tow bar 32, hinge 36, and attachment ring 33, all of conventional design and shown in previously issued patents, such as U.S. Pat. No. 4,949,986. In general, the towing assembly 31 allows the cart 20 to be linked with other carts and transported throughout ground facilities by motorized vehicles.

Figure 6:
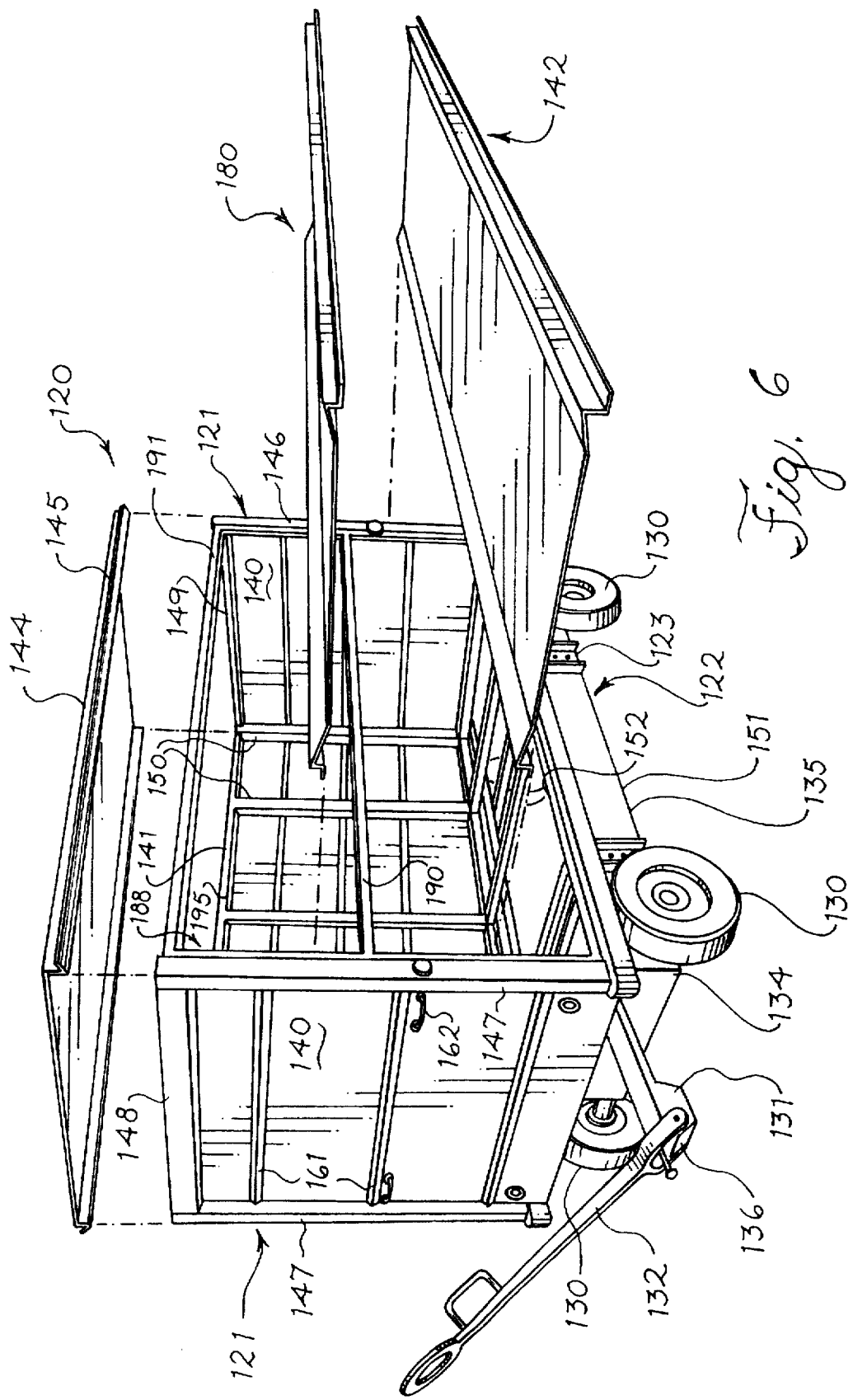
FIG. 6 is an exploded perspective view of another embodiment of the cart of the present invention.

One of the significant advantages of the embodiments shown is that the horizontal panels used to construct the cart are formed from single sheets of rolled steel to hinder the accumulation of water at weld seams and thereby prevent premature rusting or failure of these load-bearing surfaces. In particular, FIG. 6 shows the roof panel 144, shelf panel 180, and floor panel 142 exploded from the cart body 121 of another embodiment of the present invention. This configuration is known as a metal "bag cart" design including a shelf. As shown in the figure, roof panel 144, shelf panel 180, and floor panel 142 are each constructed from a single sheet of 12-gauge hot rolled, oil treated steel. Each panel is formed to fit over the particular frame structures of the cart body 121. Roof panel 144 has parallel rain gutters 145 formed on each long side of the panel 144. The gutters divert any rain or moisture dripping on the panel 144 away from the cart body 121. The floor panel 142 is welded to the base frame 152, and the shelf panel 180 is welded to the upright supports 150 and horizontal shelf support 190, the ends of which are welded to the upright supports 146 and 147 on the open side 188 of cart body 121.

The roof panel 144 is attached over the curtain rail brace 192 by welding the brace 192 to the roof 144 leaving a space 194 between the edge of roof panel 144 and the curtain brace 192. The curtain brace 192 is welded directly to the roof 144. Cylindrical metal curtain rod 193 is bolted to the corner posts 147 on the open side of the cart body 121. In order to give the roof panel 144 a curved shape, several bowed roof stiffeners 198, which are made slightly curved steel stock bent at approximately 105°. The stiffeners 198 are welded to the brace 192 and the roof side bar 195. The purpose of the stiffeners 198 is to give the roof a slightly curved shape so that rain is directed from the roof surface to the rain gutters 145.

The heavy-gauge construction of the floor, roof, and shelf panels provides a durable and lightweight assembly which is resistant to the accumulation of moisture and rust. Furthermore, the retrofittable mounting assembly configuration allows airlines to reuse the chassis from their discarded carts to construct carts of the preferred embodiment. The raised runner members on the mounting assembly also allow the baggage carts to be conveniently lifted by conventional airport forklifts. In addition, the lightweight mounting assembly and base frame do not require the use of a heavy subframe beneath the cart to construct a wheeled chassis.

Of course, it should be understood that a wide range of changes and modifications can be made to the preferred embodiment described above. For example, the various upright support members and base frame structures may utilize steel tubing having cross-sectional shapes different from the square and rectangular shapes illustrated. Furthermore, the mounting assembly structure may be utilized with any conventional cart body, whether metal or plastic, to raise the body above any chassis frame to allow lifting by a forklift, or to stabilized the frame structure of the cart body. The mounting assembly may also be used to more efficiently dampen the cart body throughout a more universal range of motion because of the angled position of the dampening pads. Thus, any chassis on a conventional baggage cart may be modified in such a fashion to provide this dampening effect. Moreover, conventional dampening devices, such as air cushions, springs, or gas shock absorbers may be used in place of the rubber dampening pads disclosed herein.

In addition, the cart body may be made in configurations different then those disclosed herein. For example, various mail carts used at airports may have different dimensional, height, and space requirements, and may necessitate replacement of shelving or cargo retention restructures within the cart. Of course, the various cart frame configurations and structures would have to be modified in order to accommodate these additional configuration changes. The cart body, mounting assembly, and chassis may be made from materials different then the steal disclosed herein. For example, aluminum, other alloys, plastic, or other gauges of steel may be used for the various components illustrated herein.

Finally, the mounting assembly may be modified to fit various other configurations of cart chassis made by different manufactures. In particular, if the various chassis frames are not rectangular as illustrated, the various runner structures and angle brackets illustrated herein may be modified to provide an equivalent structure exhibiting the benefits of the illustrated embodiments. In this fashion, almost all cart chassis configurations can use the mounting assembly and body illustrated to achieve the advantages of the present invention.

Thus, it is intended that the foregoing detailed description be regarded as illustrative rather than limiting and that it be understood that it is the following claims, including all equivalents, which are intended to define the scope of this invention.

We claim:

1. An airline baggage cart comprising:
    a cart body;
    a frame for attaching said cart body to a wheeled chassis said frame comprising:
    a first pair and a second pair of angle brackets adapted to be secured to said chassis, said angle brackets having a lower portion and an upper portion separated by an angle of approximately 135 degrees;
    at least one dampening pad mounted to each of said upper portions of said angle brackets;
    a first runner member secured to the dampening pads of said first pair of angle brackets;
    a second runner member secured to the dampening pads of said second pair of angle brackets;
    said runner members being rigidly secured to said cart body; and
    a first crossbar connecting one of said angle brackets in said first pair to one of said angle brackets in said second pair.

2. The airline baggage cart of claim 1 further comprising:
    a second crossbar linking the remaining angle bracket of said first pair to the remaining angle bracket of said second pair to align said first runner member substantially parallel to said second runner member.

3. The airline baggage cart of claim 2 wherein said first and second runner members are raised by said first and second pair of angle brackets above said wheeled chassis a sufficient distance to allow a forklift fork to enter between said chassis and said runner members.

4. The airline baggage cart of claim 3 wherein said first and second crossbar further comprise steel having at least two walls joined together at a 90 degree angle.

5. A frame for attaching an airline baggage cart body to a wheeled chassis, said frame comprising:
    a first pair and a second pair of angle brackets adapted to be secured to said chassis said angle brackets having a lower portion and an upper portion separated by an angle of approximately 135 degrees;
    a first runner member secured to said first pair of angle brackets;
    a second runner member secured to said second pair of angle brackets;
    at least one dampening pad interposed between each of said angle brackets and said first and second runner members, said runner members being raised by said first and second pair of angle brackets above said wheeled chassis a sufficient distance to allow a forklift fork to enter between said chassis and said runner members;

a first crossbar linking one of said angle brackets in said first pair to one of said angle brackets in said second pair to align said first runner member substantially parallel to said second runner member; and a second crossbar linking the remaining angle bracket of said first pair to the remaining angle bracket of said second pair to align said first runner member substantially parallel to said second runner member, said crossbars being made from steel having at least two walls joined together at a 90 degree angle, and said crossbars being welded to said angle brackets and to said chassis.

6. The frame of claim 5 wherein said first and second runner members, said angle brackets, and said crossbars are formed from 10-gauge steel.

7. A method of assembling an airline baggage cart, said method comprising:

removing a wheeled chassis from a used baggage cart;

securing a mounting assembly including a plurality of angle brackets to said chassis by fastening said angle brackets to said chassis, said mounting assembly including a plurality of runner members secured to said angle brackets and a plurality of dampening pads interposed between said angle brackets and said runner members;

securing a base frame over said runner members;

welding at least four upstanding corner posts to said base frame;

welding a plurality of corrugated metal wall panels to said corner posts;

securing a roof panel over said corner posts, said roof panel formed from a single sheet of metal; and securing a floor panel to said base frame, said floor panel formed from a single sheet of metal and substantially covering said base frame.

8. The method of claim 7 wherein the step of securing a mounting assembly to said chassis by fastening said angle brackets to said chassis is accomplished using a plurality of bolts.

9. The method of claim 7 wherein the steps of securing a roof panel over said corner posts further comprises the substeps of:

welding a plurality of roof supports to one end of each of said corner posts; and welding a roof panel to said roof supports.

10. The method of claim 7 wherein said runner members are secured to said angle brackets in a position sufficiently above said chassis a sufficient distance to allow a forklift fork to enter between said chassis and said runner members.

* * * * *

UNITED STATES PATENT AND TRADEMARK OFFICE
CERTIFICATE OF CORRECTION

PATENT NO. : 5,749,589
DATED : May 12, 1998
INVENTOR(S) : Anthony Hopkins et al.   Page 1 of 2

It is certified that error appears in the above-identified patent and that said Letters Patent is hereby corrected as shown below:

On the Title Page

In column 1, item [73], please change "Llines" to --Lines--.

In column 4, line 3, please change "900" to --90°--.

In column 4, line 17, please change "900" to --90°--.

In column 5, line 23, please change "made slightly" to --made of slightly--.

In column 5, line 50, please change "stabilized" to --stabilize--.

In column 6, line 2, please change "then" to --than-- and "steal" to --steel--.

In column 6, line 7, please change "manufactures" to --manufacturers--.

UNITED STATES PATENT AND TRADEMARK OFFICE
CERTIFICATE OF CORRECTION

PATENT NO. : 5,749,589
DATED : May 12, 1998
INVENTOR(S) : Anthony Hopkins et al.    Page 2 of 2

It is certified that error appears in the above-identified patent and that said Letters Patent is hereby corrected as shown below:

In claim 1, line 3, after "chassis", please insert --,-- (comma).

In claim 5, line 4, after "chassis", please insert --,-- (comma).

Signed and Sealed this

Twenty-fourth Day of October, 2000

Q. TODD DICKINSON

*Attest:*

*Attesting Officer*    *Director of Patents and Trademarks*